Dec. 30, 1969 H. MICHAELIS 3,487,381

REVERSIBLE RING COUNTERS COMPRISING BISTABLE TRANSDUCTORS

Filed Nov. 15, 1965 2 Sheets-Sheet 1

INVENTOR.
HORST MICHAELIS
BY
Frank R. Trifari
AGENT

REVERSIBLE RING COUNTERS COMPRISING BISTABLE TRANSDUCTORS

Filed Nov. 15, 1965

INVENTOR.
HORST MICHAELIS
BY
Frank R. Jifoni
AGENT

United States Patent Office 3,487,381
Patented Dec. 30, 1969

3,487,381

REVERSIBLE RING COUNTERS COMPRISING BISTABLE TRANSDUCTORS

Horst Michaelis, Quickborn, Germany, assignor, by mesne assignments, to U.S. Philips Corporation, New York, N.Y., a corporation of Delaware Filed Nov. 15, 1965, Ser. No. 507,740
Claims priority, application Germany, Nov. 14, 1964, P 35,502
Int. Cl. G11b *5/00;* H01f *27/42*
U.S. Cl. 340—174 4 Claims

ABSTRACT OF THE DISCLOSURE

A reversible digital counter employing a plurality of stages, each stage including a pair of feedback coupled magnetic cores, a transistor switch applying forward or backward counting pulses to all the stages, and a control circuit responsive to the output of each stage for directing a state change in either a forward or backward direction, depending on the pulse originally applied.

The invention relates to a magnetic forwards and backwards operating ring counter.

Electronic counters are being employed to an increasing extent for measuring and control purposes. Reversible counters are used frequently in control technology for comparing desired values with real values.

Counters comprising only magnetic structural elements have a substantially unlimited lifetime. The extremely high reliability involved cannot be achieved by transistorised counters.

The known counters comprising "rectangular" cores employ also magnetic structural elements, it is true, but they are not adapted to provide higher power, for example for actuating current-consuming indicators. Moreover, the magnetic states of these arrangements cannot be read in an "interference-free" manner.

A transductor may form by suitable feedback a bistable trigger amplifier and this is the basic principle of the novel reversible magnetic core counter, the individual cores of which are provided with a primary, a secondary and a feedback winding and it is characterized in that each digit of a counting section is associated with a bistable transductor consisting of two magnetic cores coupled with the secondary winding and with the feedback winding, the output voltage of which is applied across the load resistor to the control-circuit of the next-following transductor in the counting chain and to the preceding transductor and, as a counting operation is going on, a control-voltage, in common to all transductors in parallel across the secondary windings of the magnetic cores is raised by a given amount for a short, predetermined period of time, so that the relevant transductor associated with the digit concerned changes backwards and the output voltage across the load resistor is used for triggering the next-following or the preceding transductor respectively by a transient reduction of the control-voltage so that this transductor changes over and the counting operation is finished.

Each counting section, for example a decade, comprises a number of bistable transductors corresponding with the number of potential digits, said transductors being interconnected for the two counting directions so that a reversible ring counter is obtained. In the novel counter voltage-controlling transductors are employed in a self-saturating arrangement and behave in a bistable manner via feedback windings so that the individual stages provide higher power for actuating indicators, switching means or the like.

The drawing shows details and embodiments of the invention.

Therein

Figure 1:
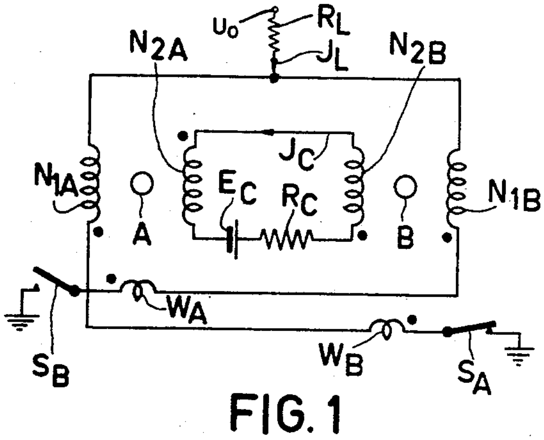
FIG. 1 shows the known arrangement of a bistable transductor in a self-saturating arrangement.

FIG. 1 shows the connection of a voltage-controlling transductor in a self-saturating arrangement. It comprises two cores A and B, which have a rectangular hysteresis loop and which have each a primary winding $N_1$ and a secondary winding $N_2$ and a feedback winding $W_A$, $W_B$. By means of two switches $S_A$ and $S_B$ a positive battery voltage $U_o$ is alternately applied for a period of time T across a load resistor $R_L$ to the primary winding of the core A (or B respectively) and in series to the feedback winding $W_B$ (or $W_A$ respectively) of the core B (or A respectively). The two secondary windings $N_{2A}$ and $N_{2B}$ are connected in series via a control-voltage $E_C$ and a control-resistor $R_C$ with a transmission circuit. If, for example, the core A is magnetically changed over from the state O (corresponding to the negative remanance point $-B_r$) to L (corresponding to $+B_r$), a voltage is induced in the secondary winding of the core A, the core B being changed over from L to O. In accordance with the coercive force $H_c$ and the magnetic wavelength 1 of the cores the transmission circuit is traversed by a current:

$$i_o=\frac{H_c\cdot 1}{n_2}$$

producing, across the control-resistor $R_C$, a voltage drop $i_C\cdot R_C$. The primary winding is traversed ($n_1=n_2$, numbers of turns of the windings $N_1$, $N_2$) by the double current $2\cdot i_C$, since the core A also requires an equal current for changing over. If $\Delta t\leqq T$ is the period of time, during which the voltage $U_o-i_C\cdot R_C$ is operative across the primary winding of the core A, flux sweeps are produced, which can be equal only if $$E_C=i_C\cdot R_C=\frac{H_c\cdot 1}{n_2}\cdot R_C$$

If the hysteresis loop of the cores were ideally rectangular, there would only be one defined control-voltage value $E_{CO}$, at which a stable magnetic change-over of the cores could take place. If $E_C<E_{CO}$, the cores would both be magnetised in the stable state L due the constant, uncompensated losses in the transmission circuit after a change-over and the load current $i_L$ would be raised to the maximum value $U_o/R_L$. If $E_C>E_{CO}$, however, the transmitted negative flux sweep would be greater than the interrogated positive flux sweep, so that the stable final stage would be such that the two cores perform each the maximum flux sweep. The medium value in time of the load current ($I_L$) would be at a minimum.

Figure 2:
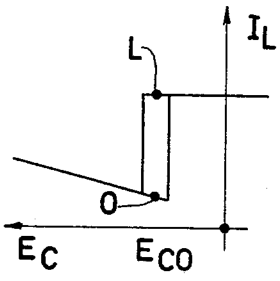
FIG. 2 shows the associated characteristic curve.

Since the hysteresis loop is not ideally rectangular and the current has to rise linearly on a first approximation due to the very high, but not infinite inductance, stable magnetic states in the proximity of the control-voltage value $E_{CO}$ are possible. The control characteristic curve or the variation $I_L=f(E_C)$ becomes V-shaped and has a flat sloping branch and a more or less steep rising branch, limited at the upper end by the value $U_o/R_L$. By means of a suitable feedback arrangement of the kind shown in FIG. 1 it is possible, in spite of the finite inductance, to obtain a bistable behaviour. In dependence upon the permeability of the core material employed and upon the desired width of the hysteresis loop of the control characteristic curve the ratio $w/n$ lies approximately within the range from 1 to 10% ($w$ is the number of turns of the feedback winding). From the ideal control characteristic curve of FIG. 2 it will be seen that with the control-voltage value $E_{CO}$ two stable states are found in the behaviour of the over-all transductors; they are designated for the sake of simplicity also by L and O.

Figure 3:
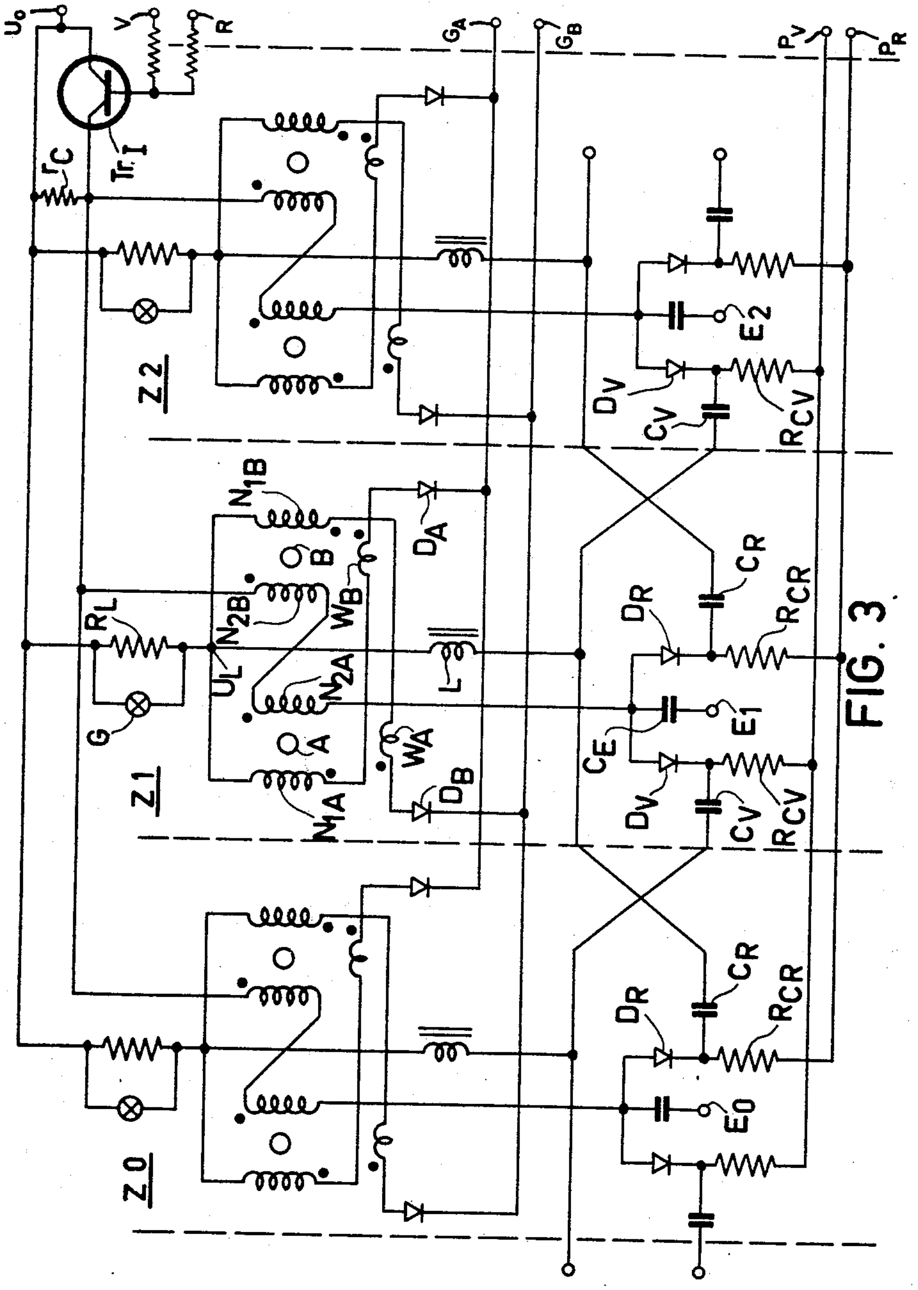
FIG. 3 shows the first three stages of a reversible decimal counting decade.

FIG. 3 shows the arrangement of the first three stages of a reversible decimal ring counter. Since for each digit of the decade the same partial arrangement is used, only the first three stages for the digits 0 to 2 are shown in FIG. 3. The following gives by way of example the description of stage 1. It comprises the cores A and B with the windings shown in FIG. 1. The load resistor $R_L$ is connected in parallel with an incandescent lamp for direct digit indication. Since all transductors of the decade have to be driven alternately via the common switch $S_A$ and $S_B$, the diodes $D_A$ and $D_B$ are required for decoupling the separate stages in order to avoid circuit currents due to the induced voltages.

Figures 4, 5:
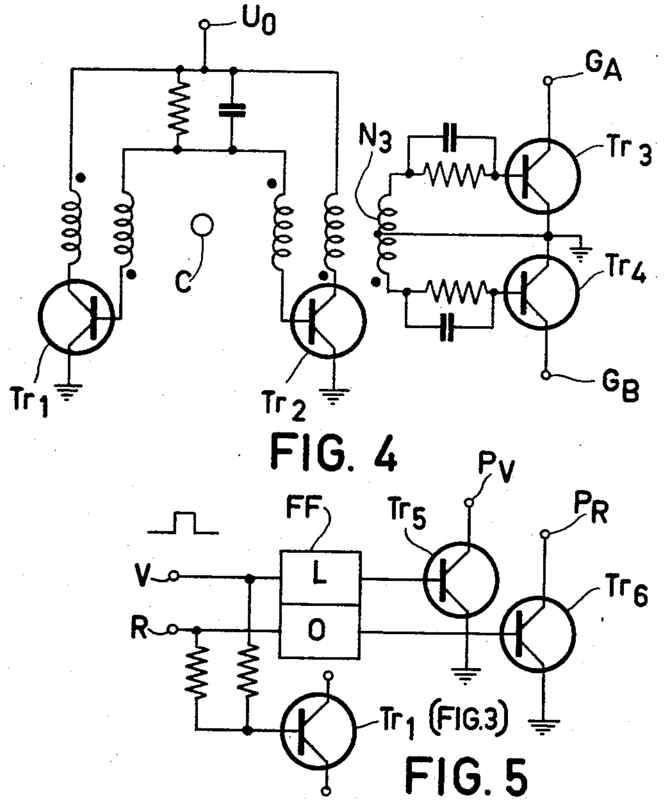
FIG. 4 shows the arrangement of the central alternating current generator for driving the transductors.
FIG. 5 is a block diagram of the central input stage of the counter.

FIG. 4 shows the arrangement for producing a square-wave voltage and for driving the switches $S_A$ and $S_B$, which are constructed like transistor switches owing to the higher switching rate. The left-hand part of FIG. 4 shows a core multivibrator having a magnetic "rectangular" core C and two switching transistors $Tr_1$ and $Tr_2$. The square-wave alternating voltage induced in a tertiary winding $N_3$ controls in pushpull two switching transistors $Tr_3$ and $Tr_4$, which replace the switches $S_A$ and $S_B$. It depends upon the overall current requirement of a decade and upon the number of the decades for the counter whether at the central station the two switching transistors $Tr_3$ and $Tr_4$ are capable of passing the overall counter current or whether separately for each decade two switching transistors have to be provided, which can then be controlled centrally by the core multivibrator. Since each time nine transductors of a decade are in the state 0 and since the load current passes through only one stage, the current requirement of a decade is:

$$I_{Dek} = 9.2 i_C + \frac{U_o}{R_L}$$

$R_L$ also includes the resistance of the incandescent lamp G, serving as an indicator.

Owing to the reversible counting possibility the control-resistor $R_C$ is replaced by the parallel combination of two control-resistors i.e. $R_{CV}$ for the forward counting and $R_{CR}$ for backward counting. There is furthermore provided a common series control-resistor $r_C$ (see FIG. 3). The ends of the resistors $R_{CV}$ are connected to the junction $P_V$ and those of the resistors $R_{CR}$ to the junction $P_R$. The diodes $D_V$ and $D_R$, like the diodes $D_A$ and $D_B$, are required for decoupling in order to avoid currents through the control-circuits.

At the center there is arranged an input stage of the counter shown in FIG. 5. A bistable trigger stage FF is set by counting pulses at the forward input V to L and by counting pulses at the backward input R to O. In accordance with the states of the trigger stage two switching transistors $Tr_5$ and $Tr_6$, controlled thereby become conducting so that during forward counting the junction $P_V$ and during backward counting the junction $P_R$ are connected to earth. The counting pulses at the input point V or R of FIG. 5 control, in addition, a switching transistor $Tr_I$, which shunts the resistor $r_C$ during the time of the counting pulses so that the control-voltages of all stages are raised from the value $E_{CO}$ to the operational voltage value $U_o$.

A counting operation will now be explained more fully with reference to FIG. 3. It is supposed that for example the stage 1 is in the state L. Accordingly the incandescent lamp G, which is associated with the digit 1, is ignited. According to the state of the trigger stage FF in the forward counting process the point $P_V$ is connected to earth. The control-currents $i_C$ passing through the transmission circuits of the transductors produce across the resistor $r_C$ a voltage drop:

$$U_r = (9 i_C + i_C' \cdot r_C)$$

The current $i_C'$ is the current passing through the transmission circuit of the stage 1, and determined by the relation:

$$i_C' = \frac{V_o - U_r}{R_{CV}}$$

It follows therefrom that:

$$U_r = \frac{9 i_C \cdot r_C + \frac{r_C}{R_{CV}} \cdot U_o}{1 + \frac{r_C}{R_{CV}}}$$

Owing to the common resistor $r_C$ a control-voltage is obtained:

$$E_C = U_o - U_r$$

which is the same for all transductors. In order to obtain two stable states, $E_C$ must be equal to $E_{CO}$ (see FIG. 1).

A forward or backward counting pulse closes the transistor $Tr_I$ as a switch, so that the resistor $r_C$ is shunted and the control voltage leaps, for the duration of the counting pulse, from the value $E_C$ to the value $U_o > E_C$. According to the control characteristic curve of FIG. 2 this results in that the transductor of the stage 1 changes over to O. The load current $I_L$ of the further stages is raised only little during these counting pulses, since the left-hand branch of the curve rises only slightly at an increase in $E_C$.

Owing to the change-over of the stage 1 from L to O the load current diminishes and the load voltage $U_L$ (see FIG. 3, stage 1) increases from zero to the value $$U_o - 2 \cdot i_c \cdot R_L$$

The rise of this load voltage is differentiated and used for controlling the adjacent stages. In order to ensure that during forward counting the stage 2 and during backward counting the stage O change over to L, the control-voltage $E_C$ of the stage 2 or of the stage O respectively must be reduced. This is performed so that the load voltage $U_L$ is applied through a capacitance $C_V$ to the junction of the diode $D_V$ and of the resistor $R_{CV}$ of the next-following stage and in the same manner through a capacitance $C_R$ to the junction of the diode $D_R$ and of the resistor $R_{CR}$ of the preceding stage. Since in forward counting the point $P_V$ is connected to earth, the rise of the load voltage $U_L$ of the stage 1 produces a voltage pulse across the resistor $R_{CV}$ of the stage 2, so that the control-voltage is reduced and the stage 2 changes over to the state L. During backward counting the stage O would change over similarly to the state L, since point $P_R$ is connected to earth. Since the rise of the load voltage $U_L$ is not continuous, but takes place intermittently due to the change-over from the state L to O, it is advantageous to connect, instead of the simple CR coupling, an inductor L (see FIG. 3) in series, so that a bandpass is formed which cuts off the high frequency parts and which forms a pulse from the voltage increase with a steeper slope so that the maximum counting frequency is increased.

Reference may furthermore be made to the provision of a plurality of decades within one counter. The connecting points $G_A$, $G_B$ and PV, PR of all decades may, as stated above, be connected to each other and to the central circuit shown in FIGS. 4 and 5, provided the switching transistors $Tr_3$ to $Tr_6$ are capable of passing the required currents. For each decade provision is made of the switching transistor for shunting the series resistor $r_C$. In the first decade the transistor $Tr_I$ is controlled directly by the counting pulses at the input V or R respectively in the arrangement shown in FIG. 5. The corresponding switching transistor $Tr_{II}$ of the second decade becomes conducting only when the first decade indicates the digit 9 and receives a forward pulse and when the first decade indicates the digit 0 and receives a backward pulse. The control of the transistor $Tr_{II}$ thus takes place through two gating circuits, which join the load voltages $U_{L9}$ or $U_{L0}$ respectively and the counting pulses at the input V or R respectively.

In order to control the transistor $Tr_{III}$ of the third decade the signals $U_{L9}$ and $U_{L90}$ have to be joined logically, in a similar manner, with the forward counting pulse and the signals $U_{LO}$ and $U_{LOO}$ have to be joined with the backward counting pulse through and-gates. With this mode of decade coupling, which is not shown in detail in the drawing for the sake of simplicity, there are no delay times for example at the change-over from 999 to 1000, which would otherwise be the case, when at the change-over from 9 to 0 or from 0 to 9 a decade had to trigger the next-following or the preceding decade respectively. Therefore the period of time of a counting operation remains constant, irrespective of the number of decades of the counter.

The possibility of a preliminary adjustment of the counter is explained in the following. When the counter indicates any sequence of digits, the counter contents may be erased in a simple manner by raising the control-voltages in all stages. For this purpose the switching transistors of the individual decades have to be closed transiently for shunting the series control-resistor $r_C$. The adjustment of the desired digits is performed directly thereafter by applying a positive voltage to one of the inputs $E_0$ to $E_9$ of the decade (see FIG. 3), so that the control-voltage of the stage concerned is transiently reduced through the capacitor $C_E$ and the transductor changes over to the state L.

What is claimed is:

1. A reversible digital counter comprising a plurality of bistable stages, each of said stages including a pair of magnetic cores with a feedback interconnection for bistable operation, first means for applying a forward or backward counting pulse to each of said stages for producing a state change in one of said stages, and second means intercoupling each of said stages and responsive to the signal produced by said state change for producing a state change in the next or preceding stage by controlling the counting direction of said counter in accordance with the pulse signal applied by said first means.

2. The reversible digital counter of claim 1 wherein each said bistable stage magnetic cores include primary, secondary and feedback windings, each feedback winding of one core of said pair being series connected with the primary winding of the other core of said pair and between a point of operating voltage and a reference point, and the secondary windings of both cores of said pairs being series connected between said first means and said second means.

3. A reversible digital counter comprising a plurality of bistable stages, each of said stages including a pair of magnetic cores having primary, secondary and feedback windings, each feedback winding of one core of said pair forming a series current path with the primary winding of the other core of said pair between a point of operating potential and a point of reference potential, the primary windings of each stage being commonly connected at one respective end thereof to a load resistor, said load resistor developing a load voltage in accordance with the bistable state of the stage associated therewith, a control circuit associated with said stage and having a first selectively operable input responsive to the load voltage of a preceding stage, a second selectively operable input responsive to the load voltage of the next successive stage, and an output terminal coupled to the secondary winding of the stage associated therewith, and switching means coupled to each of said control circuits and responsive to the presence of either a forward or backward counting pulse for selecting said first or second selectively operable input respectively for controlling the counting direction of said counter.

4. The combination of claim 3 including an inductor connected in each path coupling each stage secondary winding to its associated control circuit.

References Cited

UNITED STATES PATENTS

| | | | |
|---|---|---|---|
| 3,023,401 | 2/1962 | Loev | 340—174 |
| 2,863,138 | 12/1958 | Hemphill | 340—174 |

BERNARD KONICK, Primary Examiner

S. B. POKOTILOW, Assistant Examiner

U.S. Cl. X.R.

307—88